Figure 1:
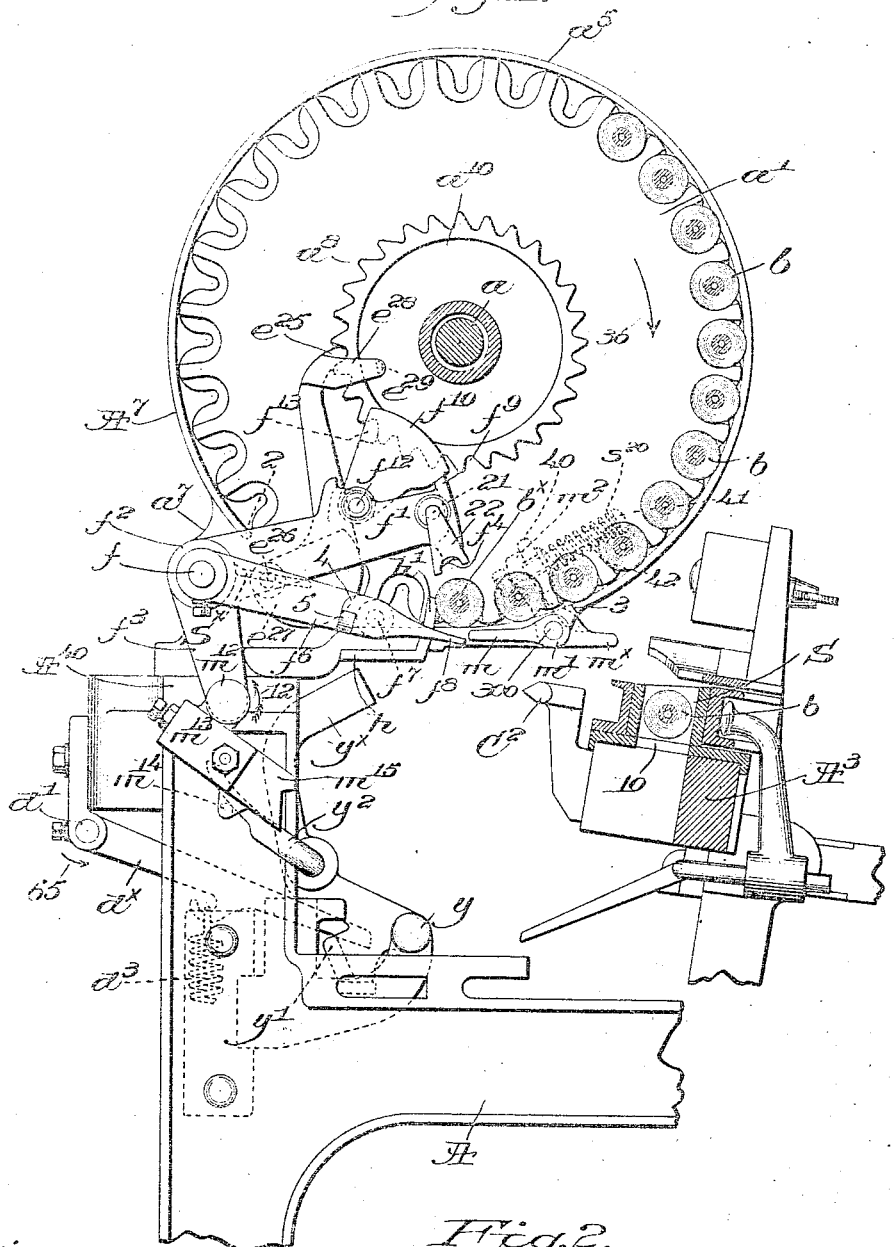

No. 664,790. Patented Dec. 25, 1900.
E. S. STIMPSON.
FILLING REPLENISHING MECHANISM FOR LOOMS.
(Application filed Sept. 22, 1900.)

(No Model.)

Witnesses,
Edward F. Allen.
Fred S. Greenleaf.

Inventor:
Edward S. Stimpson,
by Crosby Gregory
attys.

UNITED STATES PATENT OFFICE.

EDWARD S. STIMPSON, OF HOPEDALE, MASSACHUSETTS, ASSIGNOR TO THE DRAPER COMPANY, OF SAME PLACE AND PORTLAND, MAINE.

FILLING-REPLENISHING MECHANISM FOR LOOMS.

SPECIFICATION forming part of Letters Patent No. 664,790, dated December 25, 1900.

Application filed September 22, 1900. Serial No. 30,740. (No model.)

*To all whom it may concern:*

Be it known that I, EDWARD S. STIMPSON, a citizen of the United States, residing at Hopedale, county of Worcester, State of Massachusetts, have invented an Improvement in Automatic Filling-Replenishing Mechanism for Looms, of which the following description, in connection with the accompanying drawings, is a specification, like characters on the drawings representing like parts.

This invention relates more particularly to automatic filling-replenishing mechanism for looms for weaving, whereby a fresh supply of filling is automatically transferred from a magazine, hopper, or feeder to the loom when the supply of filling has been exhausted, either entirely or to a certain extent, or when the filling is broken, the replenishing of the filling taking place at such time without any attention on the part of the attendant. In one well-known type of mechanism of this character the feeder is circularly movable and is adapted to hold a series of filling-carriers, such as bobbins, the latter by intermittent movement of the feeder being brought one by one into operative position to be transferred to the shuttle, as in United States Patent No. 529,940, dated November 27, 1894. The principal duty of the weaver when attending such automatic looms is to keep the feeder supplied with filling-carriers, and the larger the feeder the greater the number of looms which can be run by the weaver; but prior to my present invention the weight of a large feeder and the load carried thereby has made it inadvisable to provide a feeder of the greater capacity.

In the patent hereinbefore referred to the feeder is moved by the partial unwinding of a strong spring automatically rewound after each transfer and the filling-carrier had to be transferred against the stress of the spring, a fixed stop positioning the feeder by engaging the next filling-carrier of the series after one had been transferred, both of these features subjecting the filling-carriers to strain, which it is desirable to avoid.

In a later patent, No. 651,715, dated June 12, 1900, the strong spring for actuating the feeder is eliminated and the movement of the feeder is effected by or through the transferrer, a fixed dog on the latter coöperating with a ratchet-wheel movable with the feeder to complete its movement, the initial movement of the feeder after transfer of a filling-carrier being effected by a light spring and also to a greater or less extent by the eccentricity of the load carried by the feeder.

In my present invention I have eliminated the strong spring utilized in the earlier patent and also the light spring employed in the later patent, while the feeder is positively moved to bring into operative position the filling-carrier next to be transferred.

In my present invention the filling-carrier next to be transferred rests against a fixed stop and the feeding movement of the feeder is controlled by or through the transferrer, but in such a manner that should one or more filling-carriers be missing for any reason the next filling-carrier which is in the feeder will be brought into operative position, and while the action of gravity may tend in this invention to effect movement of the feeder it is not relied upon to effect such function. Inasmuch as there is no strong spring herein employed, the impact of the endmost filling-carrier against the fixed stop is very light and has no tendency to break or damage the filling-carrier, the mechanism of the apparatus is greatly simplified, the capacity of the feeder very much increased, and the operation of the whole rendered more accurate, smooth, and efficient.

Figure 2:
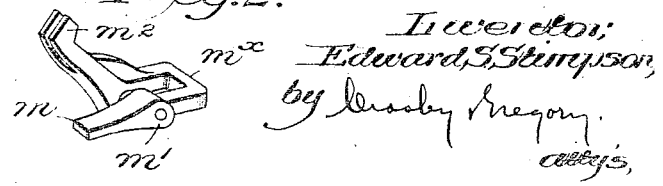

Figure 1 of the drawings represents a transverse section of a sufficient portion of a loom to be understood, with my present invention embodied therein, the section being taken transversely to the axis of and between the end plates or disks which substantially compose the feeder; and Fig. 2 is a perspective detail to be referred to.

The frame A of the loom, the lay $A^3$, slotted at 10, below one of the shuttle-boxes, and the bunter $C^2$, mounted rigidly on the lay, are of well-known construction, the slot 10 permitting the escape of the spent filling-carrier when ejected from the shuttle by the incoming fresh supply of filling, the shuttle S being constructed and arranged to automatically thread itself when the fresh filling-carrier is transferred thereto.

A stand $A^7$, substantially circular in shape, is secured upon and transversely to the breast-beam $A^{40}$, near one end thereof and projecting rearward toward the lay, a fixed stud $a$ being rigidly secured to the stand and extending from its outer face parallel to the breast-beam, the feeder or magazine being rotatably mounted on the stud, as in the patents hereinbefore referred to, and so located as to overhang one of the shuttle-boxes when the lay is fully forward.

The feeder itself comprises two parallel disks, only one of which, as $a'$, is herein shown, the disks receiving between them the filling-carriers $b$, the hubs of the two disks being connected and mounted on the stud to rotate in unison thereon. A boss $a^7$ on the stand is provided with a fixed horizontal stud $f$, on which is loosely mounted the hub $f^2$ of an arm $f'$, which extends in between the disks of the feeder and operates as the transferrer, the downturned part $f^4$ engaging the head of the filling-carrier, while the tip of the latter is engaged by the notched and downturned end 22 of an arm 21, rigidly secured to and extended laterally from the arm $f'$. A circular flange $a^5$ on the stand surrounds the disk $a'$ to protect the heads of the filling-carriers and to retain them in place until they reach substantially their operative position, the flange terminating at the points 2 and 3. A tip-supporting device $f^8$ is pivotally mounted at $f^7$ on an arm $f^6$, secured to the stud $f$, the device $f^8$ being yieldingly held in the position shown in the drawings, with its shoulder 4 resting on a lug 5 of the arm $f^6$, the tip-support yielding when a filling-carrier is transferred and serving to guide the tip of the latter at one side as it enters the recess of the shuttle. A toothed disk or ratchet-wheel $a^8$ is rotatable with and located at the inner side of a disk $a'$, the teeth of the disk corresponding in number to the holding devices for the filling-carriers, which latter are arranged circularly relatively to the axis of the feeder, and normally the transferrer occupies the position shown in the drawings, such position being maintained by a spring $S^\times$, held fast at one end and at its other acting upon the transferrer to lift it, the spring restoring the transferrer to its normal position after displacement thereof.

The feeder is positively and intermittingly moved by or through the transferrer to bring the filling-carriers one by one into position to be engaged and removed by the transferrer. Though from an inspection of the drawings it will be manifest that the greatest number of filling-carriers which can be placed in a feeder will not completely fill it, so that the preponderant weight of the load carried by the feeder is located eccentrically to and at that side of the center of gravity of the feeder opposite the transferrer, and such eccentricity of load when free to act will tend to cause rotation of the feeder in the direction of the arrow 36, thus assisting in the operation of the feeder.

The transferrer has at its free end a lateral shelf or projection $f^9$, which supports a dog $f^{10}$, pivoted on the transferrer at $f^{12}$ and provided with a tooth or pawl $f^{13}$, which coöperates with the ratchet-wheel $a^8$, the normal position of the parts being shown in the drawings, any retrograde rotation of the feeder being prevented by a detent-pawl $e^{25}$ in engagement with the ratchet-wheel and pivoted at $e^{26}$ on the stand $A^7$, said pawl having a weighted foot $e^{27}$, as herein shown, to press the pawl toward the ratchet-wheel.

To prevent any accidental disengagement of the pawl and ratchet, the former has an extension $e^{28}$ in front of the face of the ratchet-wheel and provided with a lateral lug $e^{29}$, which enters the circular recess $a^{10}$ in the face of the ratchet.

The lower endmost filling-carrier $b^\times$ of the series is shown in position to be transferred, its head resting against a stop $h'$ secured to the stand, the face of the stop being preferably convexed from top to bottom to conform to the movement of the filling-carrier during transfer. When the feeder moves forward after a transfer, the stop engages the filling-carrier next to be removed and maintains the feeder at rest, and the latter is held from backward rotation by the coöperation of the detent $e^{25}$ and the ratchet $a^{26}$, as described. When the transferrer $f'$ swings downward to engage the filling-carrier in its path, the dog $f^{10}$ moves down with it, the tooth $f^{13}$ clicking over one tooth, as herein shown, of the ratchet-wheel, thus advancing one tooth relatively to the latter, so that when the transferrer returns to normal position after transfer the dog will be raised by engagement with the shelf $f^9$, and the tooth $f^{13}$ will positively rotate the ratchet-wheel $a^8$, and thereby the feeder, through an arc great enough to bring the next filling-carrier into operative position against the guide-stop $h'$, the transferrer-lifting spring $S^\times$ being sufficiently strong to rotate the feeder as the transferrer returns to normal position. The weight of the dog causes it to follow the descent of the transferrer, while its tooth $f^{13}$ clicks over the ratchet-wheel $a^8$ to take a fresh hold, and the shelf $f^9$ positively raises the dog as the transferrer returns to normal position, so that as each transfer is effected the feeder is positively moved forward or progresses, and between successive transfers the feeder is held or locked from movement, and should one or more filling-carriers be missing the feeder will move through a correspondingly-greater feeding-arc in order to bring the next filling-carrier of the series into position against the stop $h'$.

As has been stated, the action of gravity on the eccentrically-disposed load of the feeder may be sufficient to overcome the inertia of the feeder when the lay is free to move forward; but the mechanism described, controlled as it is by the transferrer, operates to move the feeder positively and intermittingly and place the filling-carriers one by one in the path of the transferrer whether or not there be any additional gravity action. The filling-carrier next to be transferred is yieldingly supported and guided on the side opposite to the stop $h'$ by means of a cushioning device or buffer, shown as a flat finger $m$ on a swinging plate $m^\times$, provided with a hub $m'$, the said finger being located adjacent the inner face of the disk $a'$ of the feeder and opposite the stop $h'$. A second finger $m^2$ on the plate $m^\times$ is upheld and straddles the stand $A^7$, (see Fig. 2, wherein the device is shown separately,) a pin 300 passing through the hub $m'$ and the stand into the face of the finger $m^2$ to pivotally support the cushioning device, a spring $s^{20}$ (see dotted lines in the drawings) being held between a notched lug 40 on the back of the stand and the head 41 of a slide-rod 42, connected with the finger $m^2$, the rod being guided in the notched lug. The stop $h'$ forms one side of a throat through which the filling-carrier passes to the shuttle, the cushioning device or finger $m$ forming the other side, and when the transferrer descends to remove the filling-carrier from the feeder to the shuttle, the buffer yields and supports and guides the filling-carrier as it passes into the shuttle.

The attendant may at times have neglected to insert the filling-carriers consecutively in the feeder, so that one or more are absent, and in such case when the transfer of the filling-carriers takes place next such a space the feeder must move through a greater arc in order to bring the next filling-carrier into operative position. The tranferrer rises quickly, and the impulse thereby given to the feeder through the medium of the dog and ratchet-wheel, as hereinbefore described, will be sufficient to effect its advance movement until the next filling-carrier engages the stop $h'$, the detent-pawl $e^{25}$ at once falling into place to prevent retrograde movement of the feeder.

The transfer of a filling-carrier from the feeder to the loom is effected when a change in the condition of the filling in use occurs—such, for instance, as its exhaustion, entirely or to a predetermined extent, or the breakage of the filling—and when such a change occurs a rock-shaft $d'$ is rocked in the direction of the arrow 65, the rock-shaft having fast upon it an arm $d^\times$, which is depressed by a spring $d^3$. A shuttle-feeler $y^\times$ is pivoted on the frame at $y$ and is provided with a lug $y'$, on which the rocker-arm $d^\times$ is held by the spring $d^3$, the shuttle-feeler being provided with a rigid branch $y^2$. A headed rocker-stud $m^{12}$ is mounted on the downturned end $f^3$ of the transferrer, and by a spring (not herein shown) the stud is normally turned in the direction of the arrow 12, an arm $m^{13}$, secured to the stud, having a lateral lug $m^{14}$, against which the branch $y^2$ rests, and a notched dog $m^{15}$ is adjustably secured to the arm $m^{13}$, the dog being movable into the path of the bunter $C^2$ on the lay when a change of filling is to be effected.

Normally when the loom is at work the tendency of the arm $m^{13}$ to rise is restricted and overcome by the more powerful spring $d^3$, owing to the lug $m^{14}$ on the arm $m^{13}$ bearing against the arm $y^2$ of the feeler, and the upward movement of the feeler $y^\times$ is resisted by its arm $y'$ bearing against the rocker-arm $d^\times$, which, it will be remembered, is normally held down by the spring $d^3$.

When a change of filling is to be effected, the shaft $d'$ is rocked in the direction of the arrow 65, lifting the rocker-arm $d^\times$, and thereby permitting the stud $m^{12}$ to turn and raise the notched end of the dog $m^{15}$ into position to be engaged by the bunter $C^2$ as the lay beats up, the transferrer being thereby depressed to transfer the filling-carrier. This same upward movement of the dog $m^{15}$ acting through the lug $m^{14}$ upon the arm $y^2$ causes the shuttle-feeler $y^\times$ to move upwardly and rearwardly to encounter the end of the shuttle in case it is not properly boxed. If the shuttle is not in the proper position within the shuttle-box to receive a fresh filling-carrier from a feeder, the rise of the dog $m^{15}$ into the path of the bunter $C^2$ is prevented, owing to the feeler encountering the shuttle, and no change of filling takes place, and the loom may be so organized as to then stop automatically to permit the removal of the cause which led to the imperfect movement of the shuttle—such, for instance, as in United States Patent No. 529,943, dated November 27, 1894—the structure therein shown being so organized that the loom will be stopped automatically when the shuttle-feeler has detected the improper positioning of the shuttle. In United States Patent No. 628,228, dated July 4, 1899, the form of shuttle-feeler therein shown corresponds more nearly in its general construction and arrangement to the shuttle-feeler herein illustrated and described. If, however, the shuttle is properly boxed, the feeler $y^2$ completes its upward movement, and a change of filling is effected.

The shuttle-feeler and the connections between it and the dog $m^{15}$ and the devices controlling the movement of the latter herein shown and described are not of my invention; but I have herein illustrated them and briefly described their operation, to render more clear the coöperation of the various parts of the mechanism.

By the general construction and arrangement of parts hereinbefore described a number of most advantageous results are attained, among which may be mentioned a great saving in wear and tear on the filling-carriers, due to the quiet and easy yet positive feeding movement of the feeder and to the great accuracy with which the filling-carriers are inserted in the shuttle, the buffer aiding very greatly in the accurate positioning of the filling-carrier in the shuttle. Again, the number of parts of the mechanism for replenishing the filling has been reduced, simplifying the construction and operation, and by providing for a positive quiet feeding movement of the feeder a much greater number of filling-carriers can be mounted therein as a reserve supply, requiring attention for renewal less frequently and enabling one operative to attend a greater number of looms, with consequent gain in output per operative.

As herein shown, the feeder has twenty-eight filling-carrier holders which allow it, if loaded to its maximum capacity, to carry twenty-four filling-carriers at once, whereas in power-looms of this type it has not heretofore been usual or practical to have the feeders carry more than fifteen filling-carriers at one time.

Having described my invention, what I claim, and desire to secure by Letters Patent, is—

1. A rotatable filling-feeder to hold a circularly-arranged series of filling-carriers, a transferrer, and means including a member movable with and also relatively to the transferrer, to move the feeder positively and intermittingly and place the filling-carriers one by one in position to be transferred.

2. A movable filling-feeder to hold a series of filling-carriers, a transferrer to move the feeder positively and intermittingly and place the filling-carriers one by one in position to be transferred, means to normally prevent movement of the feeder, and a starting device controlled by or through the transferrer to overcome the inertia of the feeder when free to move after a transfer has taken place.

3. A movable filling-feeder to hold a series of filling-carriers, a transferrer, a dog movably mounted thereon, and a toothed member movable with the feeder and engaged by the dog when the transferrer returns to normal position to positively overcome the inertia of and to move the feeder to bring into operative position the next filling-carrier to be transferred.

4. A rotatable filling-feeder adapted to hold a series of circularly-arranged filling-carriers, a ratchet-wheel rotatable therewith, a transferrer, a dog thereupon to coöperate with the ratchet-wheel, a detent to prevent retrograde movement of the feeder, operation of the transferrer advancing the dog upon the ratchet-wheel, return of the transferrer to normal position acting through the dog to overcome the inertia of and move the feeder forward until the filling-carrier next to be transferred is in the path of the transferrer, and a stop independent of the transferrer to engage such filling-carrier and terminate feeding movement of the feeder.

5. A rotatable filling-feeder adapted to hold a series of filling-carriers, a ratchet-wheel movable therewith and notched to correspond to the position of the filling-carriers, a transferrer, a dog carried thereby to enter a notch of the ratchet-wheel and effect feeding movement of the feeder when the transferrer is retracted, to thereby bring the filling-carrier next to be transferred into the path of the transferrer, and means independent of the transferrer to stop the feeding movement when such filling-carrier is properly positioned.

6. A step-by-step rotatable holder adapted to contain a plurality of filling-supplies, a transferrer to remove the filling-supplies one after another, and means controlled by movement of the transferrer to commence and to continue the rotation of the holder after transfer of a filling-carrier therefrom.

7. A movable filling-feeder to hold a series of filling-carriers, a transferrer to engage and remove the latter one by one, means controlled by the transferrer to positively and intermittingly effect feeding movement of the feeder, and means independent of the transferrer to stop the feeding movement.

8. A movable holder to support a series of filling-supplies, a transferrer, and means, including a member movable with the transferrer, to overcome the inertia of and to thereafter effect a step-by-step movement of the holder and thereby present the filling-supplies one after another to the action of the transferrer.

9. A rotatable holder adapted to contain a plurality of filling-supplies, a transferrer to remove the latter singly from the holder, means controlled by the transferrer to move the holder through a variable arc of sufficient amplitude to bring into position the next filling-supply to be transferred, and means independent of the transferrer to stop such movement of the holder when the filling-supply next to be transferred is in operative position.

10. A rotatable filling-feeder adapted to hold a circularly-arranged series of filling-carriers with their resultant weight at one side of its axis, a transferrer movable at the opposite side of such axis to engage and remove one by one the filling-carriers as they are brought into operative position by movement of the feeder, means controlled by the transferrer and operating in conjunction with gravity to overcome the inertia of and effect feeding movement of the feeder, and means independent of the transferrer to stop such movement when the filling-carrier next to be transferred is in the path of the transferrer.

11. A movable filling-feeder to hold a series of filling-carriers, a transferrer, and means, including a member movable with and also relatively to the transferrer, to move the feeder positively and intermittingly, operation of the transferrer acting to position said member preparatory to feed movement, subsequent retraction of the transferrer acting through the said member to positively move the feeder and place the filling-carrier next to be transferred into the path of the feeder.

12. A movable filling-feeder to hold a series of filling-carriers, an attached ratchet-wheel, a transferrer, a dog fulcrumed thereon and adapted to coöperate with the ratchet-wheel to effect feed movement of the feeder upon retraction of the transferrer, to thereby bring the next filling-carrier into position to be transferred, operative movement of the transferrer positioning the dog relatively to the ratchet-wheel, and an independent stopping device to terminate the feeding movement of the feeder.

13. A movable filling-feeder to hold a series of filling-carriers, an attached ratchet-wheel, a transferrer, a dog pivotally mounted thereon and adapted to coöperate with the ratchet-wheel, the dog moving relatively to the transferrer when the latter operates, and means to move the dog in unison with the transferrer upon retraction of the latter, to effect feed of the feeder at such time and bring the filling-carrier next to be transferred into the path of the transferrer.

14. Filling-replenishing mechanism for looms, comprising a rotatable feeder to hold a series of filling-carriers, a ratchet-wheel movable with the feeder, a detent to prevent retrograde movement of the latter, and a stop to engage the leading filling-carrier of the series, the detent and stop normally coöperating to hold the feeder at rest, combined with a transferrer, and a dog fulcrumed thereon and adapted to coöperate with the ratchet-wheel when the transferrer is retracted, to positively move the feeder forward and bring the filling-carrier next to be transferred into the path of the transferrer and against the stop.

15. Filling-replenishing mechanism for looms, comprising a rotatable feeder to hold a series of filling-carriers, a ratchet-wheel movable with the feeder, a transferrer, a dog pivoted thereon and adapted to ride freely over the ratchet-wheel when the transferrer operates, a projection on the transferrer to lift the dog with the transferrer when the latter is retracted, to thereby engage the ratchet and effect positive feed of the feeder to bring the filling-carrier next to be transferred into operative position, and a stop against which such filling-carrier abuts at the completion of feed movement.

In testimony whereof I have signed my name to this specification in the presence of two subscribing witnesses.

EDWARD S. STIMPSON.

Witnesses:
 GEORGE OTIS DRAPER,
 ERNEST W. WOOD.